May 19, 1964　　　R. E. JASPERSON　　　3,133,352
SATELLITE ALERT

Filed Aug. 29, 1962　　　　　　　　　　　　　　4 Sheets-Sheet 1

Robert E. Jasperson
INVENTOR

BY Claude Funkhouser
ATTORNEY

May 19, 1964

R. E. JASPERSON 3,133,352

SATELLITE ALERT

Filed Aug. 29, 1962

Robert E. Jasperson
INVENTOR

BY Claude Funkhouser

ATTORNEY

May 19, 1964

R. E. JASPERSON 3,133,352

SATELLITE ALERT

Filed Aug. 29, 1962

Robert E. Jasperson
INVENTOR

BY Claude Funkhouser
ATTORNEY

United States Patent Office

3,133,352
Patented May 19, 1964

3,133,352
SATELLITE ALERT
Robert E. Jasperson, Annapolis, Md., assignor to the United States of America as represented by the Secretary of the Navy
Filed Aug. 29, 1962, Ser. No. 220,928
15 Claims. (Cl. 33—1)

The present invention relates in general to alerts and more particularly to a device for predicting the direction and time of appearance of an earth satellite at any given point on the earth's surface.

The Transit satellite system proposed by F. T. McClure and the subject of U.S. patent application Serial No. 736,435, filed May 12, 1958, is a system wherein earth satellites broadcasting orbital data and other information enable an observer to determine his position on the earth's surface through reception and analysis of the Doppler data signals. However, the reception time of the satellite signals is limited to the time during which radio contact can be maintained. This time is certainly long enough for an observer to receive sufficient data to calculate his position, but this time period will not be so long as to obviate the need for a certain amount of diligence in the reception of these signals. It is therefore quite useful to known the approximate direction and time of approach of such a navigational satellite so that the maximum reception time can be utilized. This is particularly true in the case of mobile stations, such as ships at sea, wherein a knowledge of the time when a selected satellite will pass within the immediate vicinity of the station is most uncertain.

The present practice for computing satellite coordinates utilizing tabular and graphic presentations of orbital data plus conventional desk-type computers for a given station requires approximately one hour. While this laborious procedure may be warranted in the case of an observer ashore wishing to determine precisely satellite phenomena for purposes of tracking or photographing, it would not suffice for ships at sea, for then the predictions must be made on short notice and within a specified order of accuracy. The invention provides a hand calculator which simulates the movement of a particular satellite in its orbit with respect to the earth. The calculator will provide the satellite coordinates at any given time and may be instrumented to produce results accurate within one degree of arc and one minute of time. A solution may be had within two minutes after the several components have been pre-set in accordance with initial set-up conditions.

It is an object of the present invention to provide an alert for predicting the location of an earth satellite with respect to a given geographical position.

It is a further object of the invention to provide an alert for predicting the location of an earth satellite with respect to a given geographical position with a high degree of accuracy and without the necessity for mental computations.

It is another object of the invention to provide an alert for establishing the angular distance and azimuth of an earth satellite with respect to a given geographical position without the necessity for mental computations.

It is still another object of the invention to provide an alert for establishing the elevation and slant range of an earth satellite with respect to a given geographical position without the necessity for mental computations.

It is still a further object of the invention to provide an alert, for predicting the location of an earth satellite with respect to a given geographical position, which is simple to operate, inexpensive to manufacture, compact in size, and accurate in performance.

Other objects and many of the attendant advantages of this invention will be readily appreciated as the same becomes better understood by reference to the following detailed description when considered in connection with the accompanying drawings, wherein.

Figure 1:
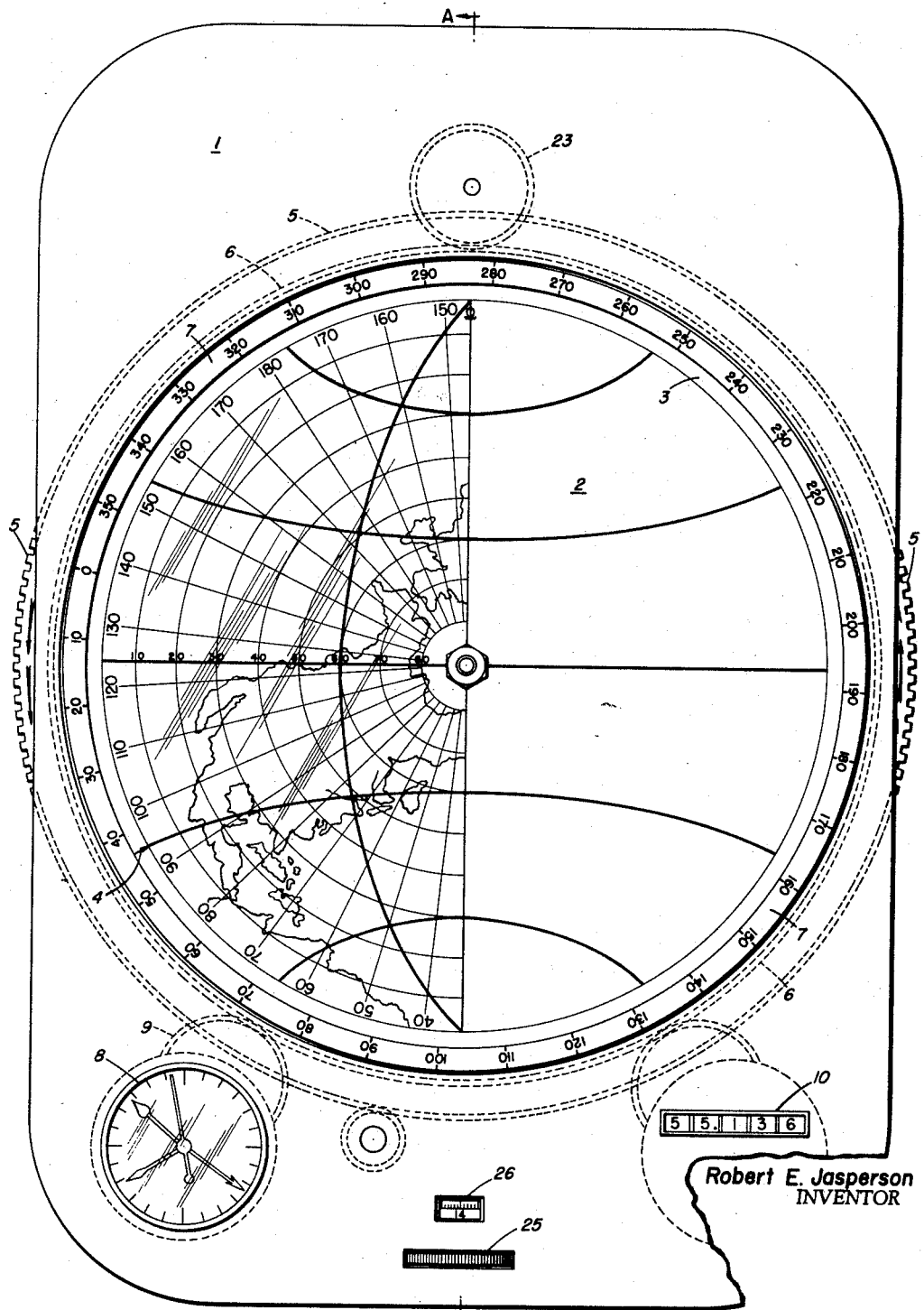
FIG. 1 is a plan view of the calculator constructed according to the invention.

One of the preferred embodiments of the invention is shown in FIG. 1 and consists of a rectangular metal or plastic casing 1 upon the obverse and reverse faces of which is centered a polar equidistant projection 2, one-half of which is transparent and the other half opaque. In the embodiment of FIG. 1 the left half of projection 2 is transparent and the right half is opaque. In order to avoid undue confusion in the explanation and understanding of the invention, the polar projection 2 has not been shown in its entirety. Only the upper branch of the plane inclined 60° to the equatorial plane and the small circles 30° and 60° on either side of the pole are shown. In practice, the planes and circles for each degree of arc, as exemplified by U.S.C. and G.S. Chart No. 3065, would appear.

Surrounding projection 2 is a transparent circular window 3 through which is viewed an arrow 4 etched upon a disc 5 mounted concentric with and below projection 2. The edge of the disc 5 extends through opposite sides of the casing 1 so that said disc may be rotated manually as required during operation of this embodiment of the invention. Arrow 4 designates the small circle which contains the satellite at any given instant. This action will be described in more detail below in connection with the operation of the invention.

Between projection 2 and disc 5 and concentric therewith is rotatably mounted a disc 6 containing a terrestrial projection of the Northern Hemisphere drawn to the same scale as the polar equidistant projection 2. In addition to the outlines of the continents this projection 6 is graduated into 90 equidistant circles of latitude and 360 meridians of longitude of which only those values in 10° increments are shown in FIG. 1. Surrounding window 3 is a metal verge 7 embedded flush in the face of casing 1 and capable of being rotated manually about the center of projection 2. The verge is graduated into 360° counter-clockwise to serve as a scale of the angular distance of the satellite from perigee at a given instant.

Mounted in the lower left corner of the casing 1 is a dummy clock 8 which is connected through gear 9 to disc 6. This dummy clock 8 is, preferably, a twenty-four hour clock containing a sweep second hand and is purely mechanical, being driven solely by the hand rotation of the discs 5 and 6. Mounted in the lower right corner of the casing 1 is a digital counter 10 which is geared to read time in kiloseconds and like dummy clock 8 is geared to disc 6. With both clocks geared to the disc 6, the discs 5 and 6 may be positioned according to Greenwich mean time or digital time, whichever is available, without the necessity of converting from one to the other.

Figure 2:
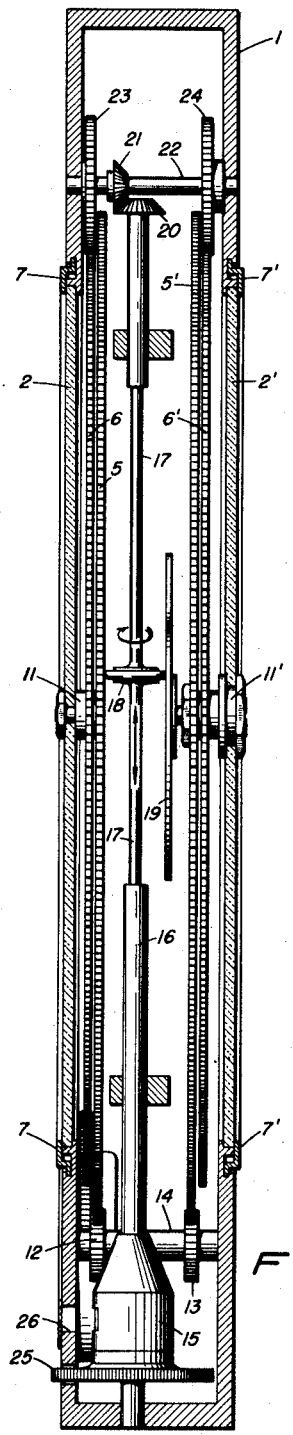
FIG. 2 is a side elevation taken along section A—A in FIG. 1.

FIG. 2 is a side view of the invention illustrated in FIG. 1 and shows that the reverse side of the device is identical to the obverse side, i.e., containing a polar projection 2' identical to projection 2, a disk 5', a disk 6' containing a terrestrial projection of the Southern Hemisphere drawn to the same scale as the projection 2'. In addition, this side of casing 1 also contains a circular window and a metal verge 7'. All of these elements are comparable and are mounted in an identical manner to the ones already described.

Discs 5 and 6 are rotatably mounted on a common shaft 11 inserted in the center of projection 2 so that they will be concentric with projection 2. In a like manner, discs 5′ and 6′ are rotatably mounted on a common shaft 11′ inserted in the center of projection 2′ so that they will be concentric with projection 2′. In order to coordinate the movement of discs 5 and 5′ so that they will rotate together, the hand driven disc 5 is coupled to disc 5′ through gears 12 and 13 which are fixed to a common shaft 14.

Mounted within the casing 1 is a micrometer 15 whose shaft 16 extends between the two sets of discs and is coupled to a second shaft 17 so as to allow lateral movement of the shaft 17 without restricting free rotation thereof. Mounted on the shaft 17 is a follower wheel 18 which bears on discs 5 and on an idler plate 19 which is coupled to shaft 11′, in a manner to be described. On the extreme end of shaft 17 is fixed a bevel gear 20 which engages a second bevel gear 21 mounted on a shaft 22 which extends between the two faces of casing 1. Mounted on the extreme ends of shaft 22 are a pair of gears 23 and 24 which, respectively, engage discs 6 and 6′.

The follower wheel 18, positioned laterally by micrometer 15, is driven rotationally by disc 5. This rotation of follower 18 is imparted to discs 6 and 6′ through the medium of the gear train comprising gears 20, 21, 23 and 24. The amount of rotation imparted to follower 18 by disc 5 depends on distance from the center of disc 5 at which the follower 18 is positioned. As the distance from the center of disc 5 to follower 18 is increased, the amount of rotation imparted to follower 18 is increased. Thus, the ratio between the rate of rotation of disc 5, which contains the satellite marker 4, and that of discs 6 and 6′, which contain the terrestrial projections, can be set by micrometer 15 to coincide with the ratio between the satellite's rotational rate within its orbit plane and the earth's rotational rate. This is accomplished by rotation of a knurled knob 25 on the micrometer 15. The knob 25 conveniently protrudes through the face of casing 1 so as to facilitate adjustment of the micrometer. A negative ratio can be established between the discs by moving the follower 18 below the center line of the discs. This situation would apply if the satellite was launched from east to west.

The micrometer 15 is conveniently calibrated so that the ratio of rotation between the discs 5 and 6 can be read directly through a window 26. Thus, if the time of complete rotation of the earth is 1430 minutes and the satellite orbital period is 102 minutes, the ratio between these rates will be 14.019. It will then be apparent that if this ratio is set on micrometer 15, a movement of disc 5 containing the satellite marker 4 through 14.019 revolutions will cause discs 6 and 6′ containing the terrestrial projections to rotate through one complete revolution. Also, with each rotation of disc 5 the dummy clock 8 will advance 1 hour and 42 minutes and the digital counter 10 will advance 6.12 kiloseconds.

Figure 3:
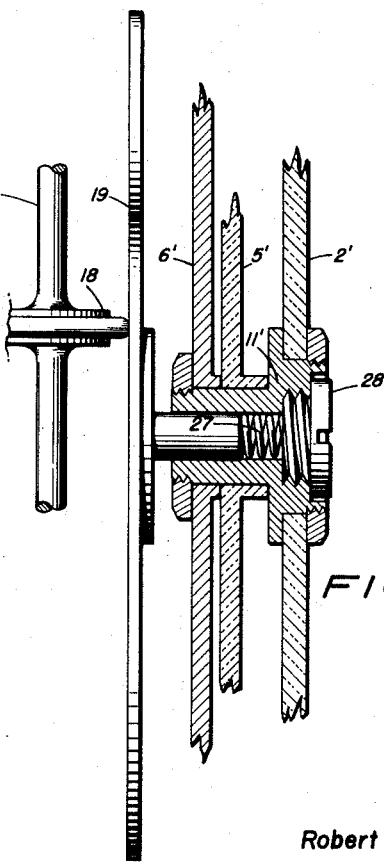
FIG. 3 is a detail section of a preferred type of friction drive to be used with the invention.

FIG. 3 illustrates a preferred means for preventing slippage between driving plate 5 and follower wheel 18. It consists of an idler plate 19 held against follower wheel 18 through the medium of a curled spring 27 located within hollow shaft 11′. The spring 27 is held under tension by a lock-screw 28 recessed in the end of shaft 11′. When the tension on spring 27 is released, as by removing lock-screw 28, follower wheel 18 may be positioned by micrometer 15 without imparting motion to the discs 5 or 6. When the several components have been oriented in accordance with known set-up conditions the lock-screw 28 is locked.

Figure 4:
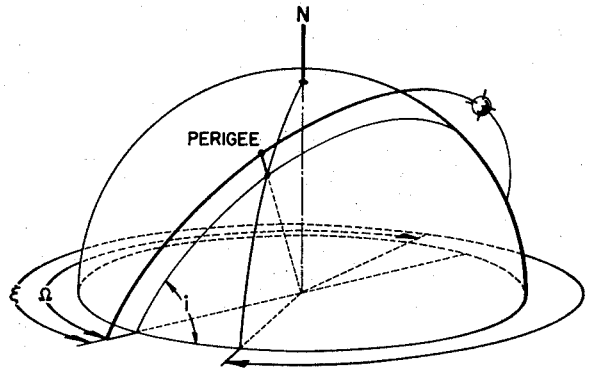
FIG. 4 is a diagram illustrating the parameters of a satellite orbit.

The determination of the position of a satellite at any given instant is predicated upon the timely receipt of the following data which will be defined in conjunction with FIG. 4:

(1) The epoch or time of perigee which is the standard time at which the satellite reaches perigee or the shortest distance from the surface of the earth;

(2) The inclination ($i$) of the orbital plane above the equatorial plane;

(3) The longitude of the ascending node ($\Omega$) at the time of perigee which is the longitude at which the satellite orbit crosses the equator when the satellite is at perigee;

(4) The argument of perigee $\xi$ which is the number of degrees measured around the equator from perigee;

(5) The ratio of earth to satellite rotation;

(6) The period of the orbit; and (7) The eccentricity of the orbit.

Given the above orbital elements the apparatus is oriented initially so as to simulate all of the conditions existing when the satellite is at perigee. With the lock-screw 28 unlocked disc 5 is rotated until the digital counter 10 which is geared thereto displays the given epoch or time of perigee. This same value in conventional units of time is automatically displayed on the dummy clock 8 since it is also geared to disc 5. With the proper time of perigee set on the dummy clock 8 and the digital counter 10, these two mechanisms are disengaged from the gear teeth of actuating disc 5 in a conventional manner, as by means of stems protruding through the bottom of casing 1.

The micrometer 15 is then set to the given ratio of earth to satellite rotation by manipulating knurled knob 25 and viewing the proper setting through window 26. The longitude of the ascending node is set when the given value on disc 6 is aligned with the indicating mark $\Omega$ on disc 2 as shown in FIG. 1. The value 146° east has been chosen by way of example. The proper orientation of disc 6 is accomplished by manipulating gears 23 and 24 as by means of a stem (not shown) projecting through the top of casing 1. This step orients the terrestrial projection on disc 6 so that at the time of perigee the entire orbit of the satellite in the Northern Hemisphere is visible through the transparent half of projection 2 and the entire portion of the orbit in the Southern Hemisphere is visible through the transparent half of projection 2′. The primary purpose of the opaque portions of projections 2 and 2′ is to prevent confusion as to whether the satellite is in the Northern or Southern Hemisphere at any given time.

The argument of perigee is then set by rotating verge 7 manually until the given angular value appears opposite the ascending node $\Omega$. The argument of perigee illustrated in FIG. 1 is 283°. Disc 5 can now be oriented so that the satellite marker 4 inscribed thereon is opposite perigee, the 0° mark on verge 7. The apparatus is then locked up by engaging the lock-screw 28 which places the idler plate 19 associated with follower wheel 18 and disc 5 under tension, and by re-engaging the dummy clock 8 and the digital counter 10.

To determine the time and direction of the passing of the satellite within the vicinity of a selected geographic location, disc 5 is rotated in a counter-clockwise direction until the orbital plane (here assumed to be 60°) and the small circle containing the satellite as indicated by arrow 4 intersect within visual distance of the chosen geographical position. The time of this occurrence can then be read directly off of dummy clock 8. As disc 5 is rotated the arrow 4 inscribed thereon will follow the movement of the satellite along the orbital plane. When the arrow reaches the opaque portion of projection 2, the satellite passes from the Northern to the Southern Hemisphere and must be followed on the reverse side of the apparatus where the Southern Hemisphere is visible on disc 6′. It is also noted that as disc 5 is rotated discs 6 and 6′ will also rotate according to the ratio set by follower wheel 18. Since the projection 2 is stationary, it is obvious that the satellite orbit will precess over the earth's surface with each orbit of the satellite.

A satellite in circular orbit 1275 miles above the earth's surface would appear within radio range 6° above the horizon at a slant range of 3125 miles when the angular distance measured at the center of the earth between the geographic location and the satellite's geographic position is 36°. Taking this factor into consideration, the location at which the satellite will first come within radio range can be calculated and the time at which this will occur can be determined by positioning the arrow 4 at this point and reading the dummy clock 8.

Figure 5:
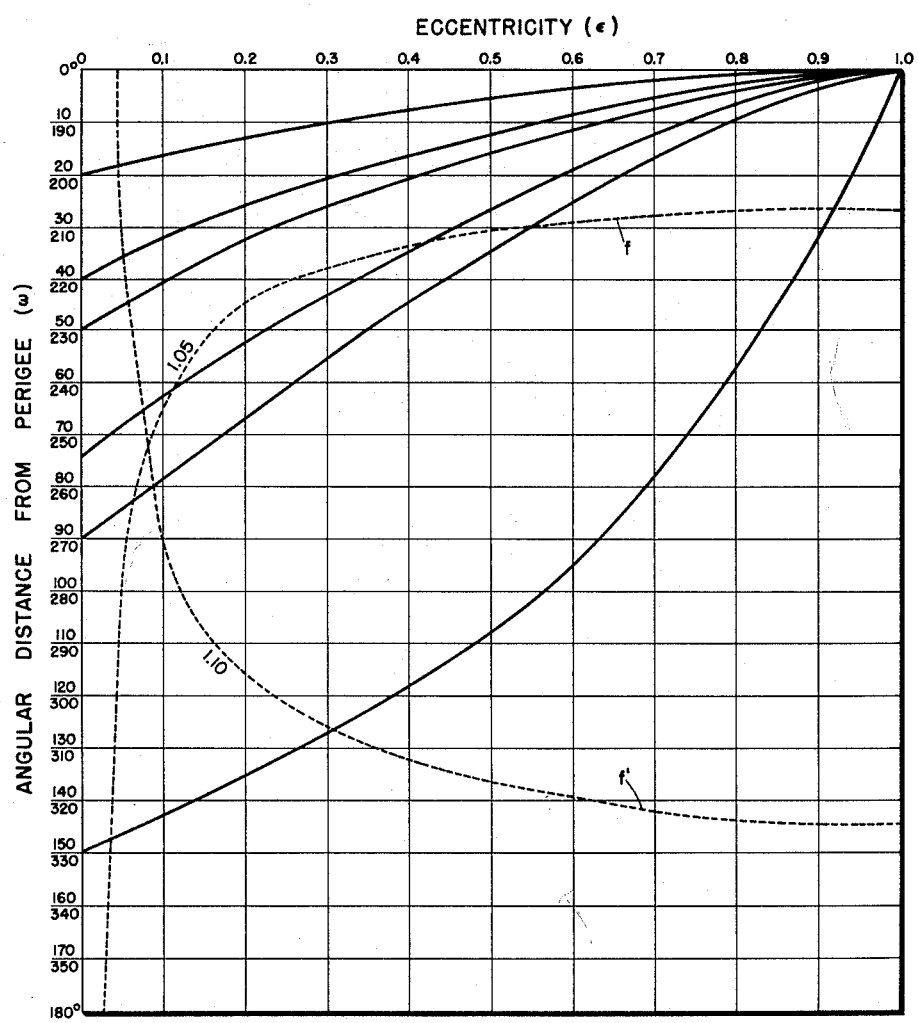
FIGS. 5, 6 and 7 illustrate a series of charts which are useful in correcting the satellite parameters in the case of a non-circular orbit.
Figure 6:
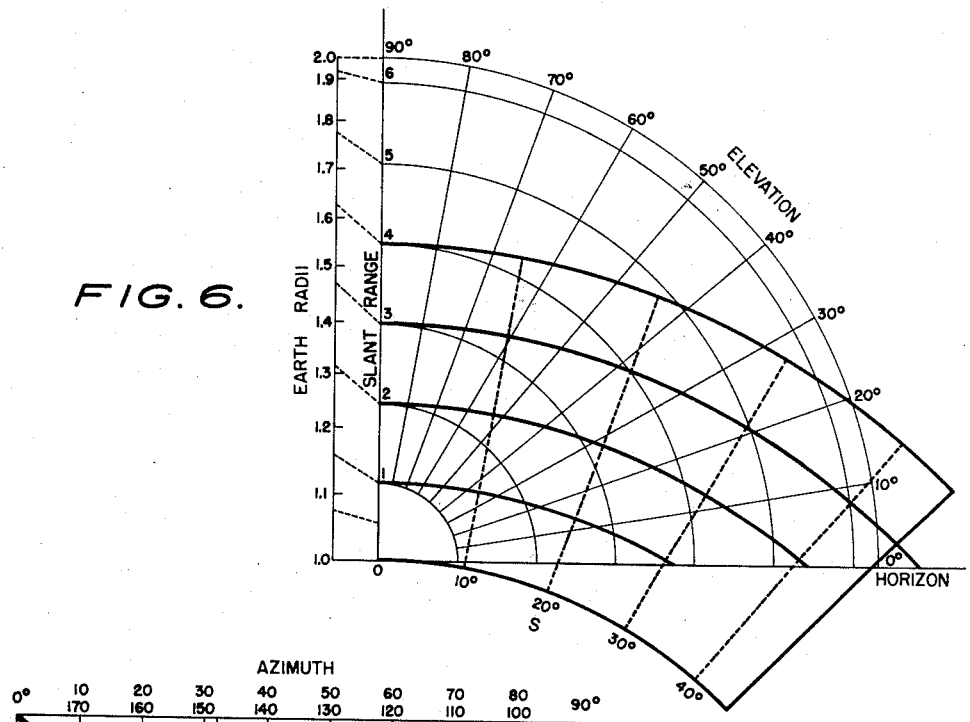
Figure 7:
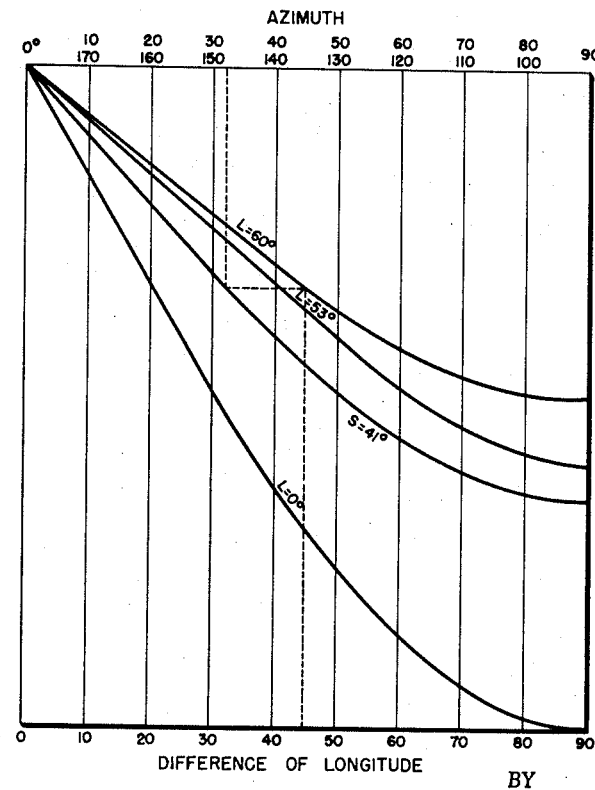

Since the satellite will probably not be precisely in circular orbit, several aids have been devised to obtain exact positional data when the eccentricity of the orbit is known. These aids in the form of charts are illustrated in FIGS. 5, 6 and 7. FIG. 5 is an eccentricity diagram which displays graphically the values tabulated in Tables III–A and III–B of I.G.Y. Report No. 7 distributed by N.A.S.A. This chart is entered with the angular distance from perigee $\omega$ on the left and eccentricity $\epsilon$ at the top. The intersection of the curved line through the proper value of $\omega$ and the vertical line through $\epsilon$ is carried horizontally to the left where the angular distance from perigee equivalent to these values is found. For simplicity, not all of the curved lines which correspond to $\omega$ values have been shown in FIG. 5. Thus, the angle $\omega=40°$ becomes 32° at $\epsilon=0.1$. When $\omega$ exceeds 180° the values in the left hand scale repeat themselves. Thus, the angle $\omega=220°$ becomes 212° at $\epsilon=0.1$. The equivalent angle is always less than the entering argument in an elliptical orbit.

The radial distance factor $f$ is found in FIG. 5 by moving horizontally to the right from the proper value of $\omega$ on the left hand scale to the vertical line through $\epsilon$ and noting the value of the doted line $f$ through that point. For values of $\omega$ greater than 180° the factor $f$ is represented by a dotted line $f^1$. Again, all of the lines representing all of the values of the factor $f$ have not been shown in the figure to avoid confusion.

The chart illustrated in FIG. 6 relates angular distance S and earth radii to elevation and slant range. The value of earth radii is found by multiplying the given value of semi-major axis by factor $f$ derived from FIG. 5. By following the resulting curve representing height above the earth's surface to its intersection with the angular distance S, the elevation angle in degrees and the slant range in kilometers can be determined by inspection.

FIG. 7 illustrates a modified Rust's azimuth diagram in which the entering arguments are difference of longitude between the given station and the satellite's geographic position, the latitude of the satellite and its angular distance S from the station. In the example shown in the figure the longitude difference is 45° W, the latitude is 60° N and the angular distance S is 41°. The resulting azimuth read off of the upper scale is 32.6° N–W.

When the station and the satellite are in opposite hemispheres and the latter is approaching the station it will be apparent that the two locations cannot be plotted on the same projection. In this case the point at which the satellite will cross the equator and the time thereof are the only early data available.

It will be noted that time may be expressed in any desired units depending upon the form in which the initial data are transmitted. The dummy clock shown in FIG. 1, therefore, may be adjusted to read either Greenwich mean time, local zone time, daylight savings time or a combination of two or more of these systems. Time may also be expressed in minutes, seconds or multiples or fractions thereof.

Whereas it may be expected that information regarding the orbital elements will be disseminated at frequent intervals, the accuracy with which positional data may be determined through the medium of this proposed apparatus should not deteriorate appreciably over a period of several weeks.

It should be understood that other modifications of this invention are possible within the light of the above teachings. For example, the device may be made automatic by providing a stable clock as a driving mechanism. The device may also be adapted for mounting on an instrument panel by providing the projections of the Northern and Southern Hemispheres on discs mounted in a non-concentric manner and geared to one another so that proper rotation of the discs is effected. It is therefore to be understood that within the scope of the appended claims the invention may be practiced otherwise than as specifically described.

What is claimed is:

1. A satellite alert comprising a plurality of projections of the surface of a celestial body, said celestial projections being geared to one another, a marker associated with said projections and representing a satellite of said celestial body, means connecting said projections to said marker for regulating the relative rate of rotation between said projections and said marker, and clock means for indicating the time for each position of said marker in relation to said projections.

2. A satellite alert comprising a terrestrial projection of the Northern Hemisphere and a terrestrial projection of the Southern Hemisphere, said terrestrial projections being geared to one another, a marker associated with each projection representing an earth satellite, said markers being geared to one another, means connecting said projections to said markers for regulating the relative rate of rotation between said projections and said markers, and clock means for indicating the time for each position of said markers in relation to said projections.

3. A satellite alert comprising a plurality of projections of the surface of a celestial body, said celestial projections being geared to one another, a marker associated with said projections representing a satellite of said celestial body, adjustable means connecting said projections to said marker for providing coordinated movement between said projections and said marker so that said moving marker will follow the path of a satellite on said projections, and clock means for indicating the standard time for each position of said marker in relation to said projections.

4. A satellite alert comprising a terrestrial projection of the Northern Hemisphere and a terrestrial projection of the Southern Hemisphere, said projections being geared to one another, a pair of markers each associated with one of said projections, said markers being geared to one another, adjustable means connecting said projections to said markers for providing coordinated movement between said projections and said markers so that said moving markers will follow the path of a satellite on said projections, and clock means for indicating the standard time for each position of said markers in relation to said projections.

5. A satellite alert comprising a plurality of concentric discs, the first of said discs containing a terrestrial projection of one hemisphere of the earth's surface, the second of said discs being geared to said first disc and containing a marker representing an earth satellite, the third of said discs being stationary and containing a polar equidistant projection, means for adjusting the gear ratio between said first and second discs, and clock means for indicating the standard time for each position of said marker in relation to said terrestrial projection.

6. A satellite alert comprising a plurality of pairs of concentric discs, the first pair of said discs being locked to one another and containnig, respectively, a terrestrial projection of the Northern Hemisphere and a terrestrial projection of the Southern Hemisphere, the second pair of discs being geared to said first pair of discs and each containing a marker representing an earth satellite, the third pair of said discs being stationary and each containing a polar equidistant projection, means for adjusting the gear ratio between said first and second pairs of discs, and clock means for indicating the standard time for each position of said markers in relation to said terrestrial projections.

7. A satellite alert comprising a rectangular casing containing a plurality of concentric discs, the first of said discs being stationary, integral with the face of said casing, and containing a polar equidistant projection, the second of said discs containing a terrestrial projection of one hemisphere of the earth's surface, the third of said discs being geared to said second disc and containing a marker representing an earth satellite, means for adjusting the gear ratio between said second and third discs, and clock means for indicating the standard time for each position of said marker in relation to said terrestrial projection.

8. A satellite alert as defined in claim 7, wherein said gear ratio adjusting means comprises a follower wheel in contact with said third disc and a micrometer for laterally positioning said follower wheel in relation to said third disc, said follower wheel being coupled to said second disc so that rotation of said third disc will cause proportional movement of said second disc.

9. A satellite alert comprising a rectangular casing containing a plurality of pairs of concentric discs, the first pair of said discs being stationary, integral with the obverse and reverse faces of said casing and each containing polar equidistant projections, the second pair of said discs being locked together and containing, respectively, the terrestrial projection of the Northern Hemisphere and the terrestrial projection of the Southern Hemisphere, the third pair of said discs beign locked together and each containing a marker representing an earth satellite, means for adjusting the gear ratio between said second and third pairs of discs to conform with the ratio between the rotation of a satellite and the rotation of the earth, and clock means for indicating the standard time for each position of said markers in relation to said terrestrial projections.

10. A satellite alert as defined in claim 9, wherein said gear ratio adjusting means comprises a follower wheel in contact with one disc of said third pair and a micrometer for laterally positioning said follower wheel in relation to said third pair of discs, said follower wheel being coupled to said second pair of discs so that rotation of said third pair of discs will cause proportional movement of said second pair of discs.

11. A satellite alert comprising a rectangular casing, a first pair of stationary discs partially opaque and each mounted integral with a face of said casing and each containing a polar equidistant projection, a second pair of discs which are geared together and contain, respectively, a terrestrial projection of the Northern Hemisphere and a terrestrial projection of the Southern Hemisphere, a third pair of discs geared together and each containing a marker representing an earth satellite and each geared to said second pair of discs, a pair of annular windows mounted in a face of said casing for viewing said markers, means for adjusting the gear ratio between said second and third pairs of discs, a pair of movable annular graduated scales mounted on a face of said casing, and clock means for indicating the standard time for each position of said markers in relation to said terrestrial projections.

12. A satellite alert as defined in claim 11, wherein said gear ratio adjusting means comprises a follower wheel in contact with one disc of said third pair, and a micrometer for laterally positioning said follower wheel in relation to said third pair of discs, said follower wheel being coupled to said second pair of discs so that rotation of said third pair of discs will cause proportional movement of said second pair of discs.

13. A satellite alert comprising a rectangular casing, a first stationary disc partially opaque mounted integral with the face of said casing and containing a polar equidistant projection, a second disc containing a terrestrial projection of one hemisphere of the earth's surface, a third disc geared to said second disc and containing a marker representing an earth satellite, said second and third discs being located within said casing in concentric relation with said first disc, an annular window mounted in the face of said casing about said first disc for viewing the marker on said third disc, means for adjusting the gear ratio between said second and third discs, a movable annular graduated scale mounted on the face of said casing about said annular window, and clock means for indicating the standard time for each position of said marker in relation to said terrestrial projection.

14. A satellite alert as defined in claim 13, wherein said gear ratio adjusting means comprises a follower wheel in contact with one disc of said third pair and a micrometer for laterally positioning said follower wheel in relation to said third pair of discs, said follower wheel being coupled to said second pair of discs so that rotation of said third pair of discs will cause proportional movement of said second pair of discs.

15. A satellite alert comprising a rectangular casing, a first pair of stationary discs partially opaque and each mounted integral with the obverse and reverse faces of said casing and each containing a polar equidistant projection, a second pair of discs which are geared together and contain, respectively, a terrestrial projection of the Northern Hemisphere and a terrestrial projection of the Southern Hemisphere, a third pair of discs geared together and each containing a marker representing an earth satellite and each geared to said second pair of discs, all of said discs being mounted concentrically with each other, an annular window mounted in the face of said casing about each of the discs of said first pair for viewing said markers, a follower wheel mounted in contact with one disc of said third pair, a micrometer connected to said follower wheel for laterally positioning said follower wheel in relation to said third pair of discs, said follower wheel being coupled to said second pair of discs so that rotation of said third pair of discs will cause proportional movement of said second pair of discs, and clock means for indicating the standard time for each position of said markers in relation to said terrestrial projections.

References Cited in the file of this patent

UNITED STATES PATENTS

| | | |
|---|---|---|
| 1,223,502 | Mace | Apr. 24, 1917 |
| 2,304,797 | Collins | Dec. 15, 1942 |
| 2,376,006 | Putman | May 15, 1945 |
| 2,949,682 | Humbert | Aug. 23, 1960 |
| 3,035,356 | Musser | May 22, 1962 |